United States Patent [19]

Sackett et al.

[11] Patent Number: 5,152,379
[45] Date of Patent: Oct. 6, 1992

[54] ADJUSTABLE SHOCK ABSORBER ASSEMBLY

[75] Inventors: Ray A. Sackett; Charles E. Tyrrell, both of Monroe, Mich.

[73] Assignee: Monroe Auto Equipment Company, Monroe, Mich.

[21] Appl. No.: 509,895

[22] Filed: Apr. 16, 1990

[51] Int. Cl.⁵ .............................................. F16F 9/46
[52] U.S. Cl. .................................. 188/299; 188/319; 188/320; 188/322.15
[58] Field of Search ............... 188/319, 299, 320, 282, 188/317, 322.15; 280/714

[56] References Cited

U.S. PATENT DOCUMENTS

| | | |
|---|---|---|
| 2,061,068 | 11/1936 | Fuchs . |
| 3,039,566 | 6/1962 | Ramsey . |
| 3,124,368 | 3/1964 | Corley . |
| 3,365,033 | 1/1968 | Willich ................................ 188/319 |
| 4,031,989 | 6/1977 | Blazquez . |
| 4,313,529 | 2/1982 | Kato . |
| 4,468,050 | 8/1984 | Woods . |
| 4,534,580 | 8/1985 | Kobayash . |
| 4,535,877 | 8/1985 | Shimokura . |
| 4,597,411 | 7/1986 | Lizell . |
| 4,600,215 | 7/1986 | Kuroki . |
| 4,635,960 | 1/1987 | Shirakuma . |
| 4,638,896 | 1/1987 | Poyser . |
| 4,645,044 | 2/1987 | Kato . |
| 4,660,686 | 4/1987 | Munning . |
| 4,671,392 | 6/1987 | Wossner . |
| 4,682,675 | 7/1987 | Eddy . |
| 4,696,379 | 7/1987 | Yamamoto . |
| 4,723,640 | 2/1988 | Beck . |
| 4,726,453 | 2/1988 | Obstfelder . |
| 4,729,459 | 3/1988 | Inagaki . |
| 4,732,408 | 3/1988 | Ohlin . |
| 4,741,554 | 5/1988 | Okamoto . |
| 4,749,069 | 6/1988 | Knecht . |
| 4,749,070 | 6/1988 | Moser . |
| 4,785,920 | 11/1988 | Knecht . |
| 4,854,429 | 8/1989 | Casey ................................ 188/299 |
| 4,943,083 | 7/1990 | Groves et al. ...................... 280/707 |

FOREIGN PATENT DOCUMENTS

| | | |
|---|---|---|
| 0115202A1 | 8/1984 | European Pat. Off. . |
| 0123365A2 | 10/1984 | European Pat. Off. . |
| 1505417 | 3/1970 | Fed. Rep. of Germany . |
| 2326983 | 12/1974 | Fed. Rep. of Germany ...... 188/282 |
| 3405315 | 2/1984 | Fed. Rep. of Germany . |
| 3425988 | 7/1984 | Fed. Rep. of Germany . |
| 3348176 | 4/1985 | Fed. Rep. of Germany . |
| 2911768 | 10/1989 | Fed. Rep. of Germany . |
| 1095506 | 6/1955 | France . |
| 1130621 | 2/1957 | France . |
| 1508169 | 10/1966 | France . |
| 55-142141 | 6/1980 | Japan . |
| 57-173630 | 10/1982 | Japan . |
| 57-173632A | 10/1982 | Japan . |
| 57-182506 | 11/1982 | Japan . |
| 58-50339 | 3/1983 | Japan . |
| 58-141909 | 8/1983 | Japan . |
| 58-146742 | 9/1983 | Japan . |
| 59-97339 | 6/1984 | Japan . |
| 59-128941 | 8/1984 | Japan . |
| 59-137641 | 8/1984 | Japan . |
| 61-13041A | 1/1986 | Japan . |
| 61-153031A | 11/1986 | Japan . |
| 664770 | 1/1952 | United Kingdom . |
| 1450765 | 7/1976 | United Kingdom . |
| 1485003 | 9/1977 | United Kingdom . |
| 1450441 | 7/1979 | United Kingdom . |
| 2112104A | 7/1983 | United Kingdom . |
| 2120355A | 11/1983 | United Kingdom . |
| 2134625A | 8/1984 | United Kingdom . |
| 2159917A | 12/1985 | United Kingdom . |

Primary Examiner—Geroge E. A. Halvosa
Attorney, Agent, or Firm—Harness, Dickey & Pierce

[57] ABSTRACT

A shock absorber comprises a piston and piston rod assembly mounted for reciprocation in a cylinder, the piston dividing the cylinder into upper and lower chambers, a floating disk valve slidably disposed in a fluid reserve chamber of the piston for movement between first and second positions to selectively open and close fluid passages associated with the assembly to vary the resistance to damping fluid moving through the assembly and between the chambers, and a solenoid-plunger for regulating the flow of damping fluid between the chambers. The disk valve movement is controlled by the solenoid-plunger and when the disk is in a first position augments flow between the upper and lower chambers to provide "soft" compression and rebound strokes and when the disk is in a second position restricts flow between the upper and lower chambers to provide "firm" compression and rebound strokes.

4 Claims, 6 Drawing Sheets

*Firm Rebound*

Firm Compression

Soft Rebound

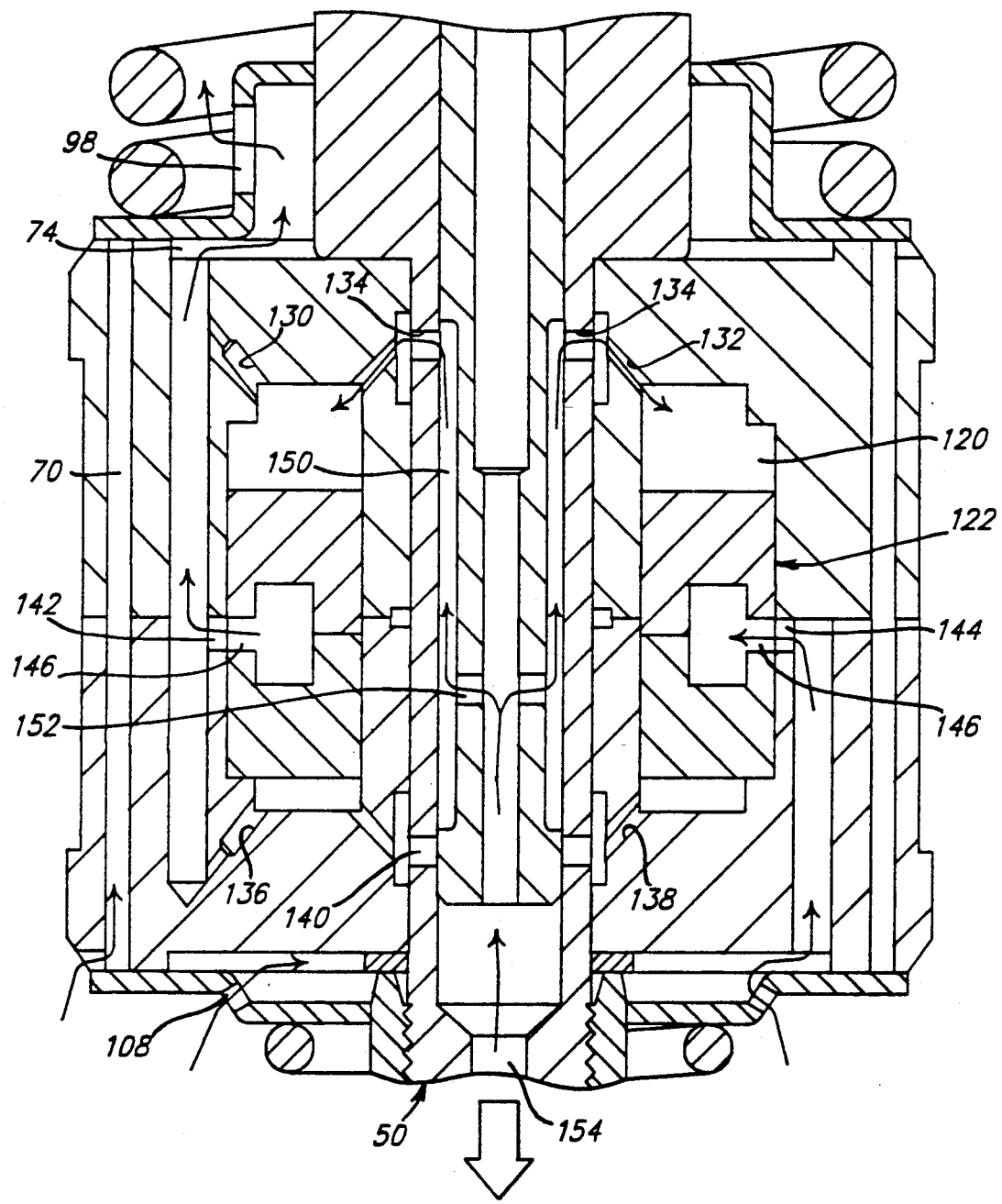
Soft Compression
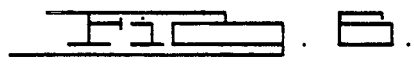

ADJUSTABLE SHOCK ABSORBER ASSEMBLY

BACKGROUND AND SUMMARY OF THE INVENTION

This invention relates to a piston-type fluid suspension system and more particularly to a piston assembly having a bypass valve for selectively adjusting the damping characteristics of the shock absorber both during compression and rebound strokes of the shock absorber piston.

Various piston-type fluid shock absorbers have included apparatus for adjusting or controllably varying the shock absorbers, damping characteristics or cushioning effects during compression or rebound of the shock absorber. In prior shock absorbers of this type, various fluid openings have been disposed in, or otherwise associated with, the shock absorber piston or the piston rod, along with means for selectively opening or closing such fluid openings in order to vary the resistance to hydraulic fluid flowing through the piston or piston end piston rod assembly.

Because different driving characteristics depend upon the amount of damping forces the shock absorber provides, it is often desirable to have a shock absorber in which the amount of damping forces generated by the shock absorber is adjustable. Exemplary of a shock absorber for selectively changing the damping characteristics of a shock absorber is U.S. Pat. No. 5,016,908, issued May 21, 1991, "Method and Apparatus for Controlling Shock Absorbers", the disclosure of which is hereby incorporated by reference.

Further, the greater the degree to which the flow of damping fluid within the working chamber is restricted by a piston assembly, the greater the damping forces which are provided by the shock absorber Accordingly, a "soft" compression and rebound stroke is produced when the flow of damping fluid is relatively unrestricted and a "firm" compression and rebound stroke is produced when the flow of damping fluid is restricted.

An object of the shock absorber of this application is provision of a method and apparatus for controlling shock absorbers in which the amount of damping fluid flowing between the upper and lower portions of the working chamber can be controlled with a relatively high degree of accuracy and speed. Advantageously, such apparatus when adjusted would provide enhanced road holding and handling by rapidly changing between "firm" and "soft" rebound and compression conditions.

Another object of this invention is simplification of the piston assembly by reducing both the number and complexity of the components thereof needed to control the damping forces. Advantageously, a by-pass valve is driven by a ported plunger, from a first position, to produce a soft compression stroke and a firm rebound stroke, and to a second position, to produce a firm-compression stroke and a soft rebound stroke. The improved piston assembly enhances the road handling ability and/or road holding ability of the vehicle by controlling the damping forces of the shock absorber.

Another object of the invention is to provide a new and improved piston assembly for a shock absorber that employs a "floating" piston within the piston of an existing shock absorber to control the damping flow conditions. Advantageously the floating piston is a relatively uncomplicated design, economical to manufacture, and is adaptable to a wide variety of adjustment applications.

Another object of the present invention is to provide a method of apparatus for controlling shock absorbers in which the occurrence of a compression or rebound stroke may be determined by measuring the pressure differential between the damping fluid in the upper and lower portions of the working chamber (i.e., the pressure difference across the piston of the shock absorber).

Yet another object of the present invention is to provide a shock absorber whose damping characteristics can be easily and conveniently controlled from a remote or external position relative to the shock absorber and which is adaptable to a wide variety of adjustment actuation applications.

To achieve the above-mentioned objects, a controllable fluid shock absorber assembly includes a cylinder defining a fluid pressure chamber, a piston rod slidably movable within the chamber, and a piston secured to the piston rod for movement therewith. The piston rod extends outwardly from the chamber, is centrally bored, and has fluid openings to pass fluid. The piston comprises a cylindrical piston body that divides the pressure chamber into an upper rebound and a lower compression chamber. In accordance with the preferred embodiments of the present invention, the piston body has a fluid reserve chamber therewithin which receives a "floating" piston, restricted first flow passages which operate to pass fluid between the upper and lower chambers during respective compression and rebound strokes, second flow passages which operate to pass fluid between the upper and lower chambers via internal pilot ports and the fluid reserve chamber, and third flow passages or openings to communicate damping fluid between the chamber and the second passages. The floating piston divides the fluid reserve chamber into upper and lower pressure chambers and includes an internal chamber that defines a passageway to pass fluid from the second passages, through the third flow passages, through the internal chamber of the piston and through the bore of the piston rod. The floating piston is controlled by operating pressures found inside the chamber which are routed by a solenoid valve that controls the flow of damping fluid between the upper and lower chambers of the working chamber during compression and rebound of the piston. An external control unit electrically controls a solenoid valve to move the respective openings of a plunger between a first and second position to control the flow of damping fluid through first and second flow paths, respectively, relative to the first and second chamber portions.

Advantageously, the floating piston operates to efficiently and rapidly change the ride characteristics of the shock absorber assembly. Further, sensor means used in connection externally with the shock absorber change the ride characteristics of a car depending upon the user's desires.

Other objects, advantages and features of the present invention will become apparent to one skilled in the art upon reading the following description and dependent claims, taken in conjunction with the following drawings.

BRIEF DESCRIPTION OF THE DRAWINGS

FIG. 6 is similar to FIG. 3 and shows the floating piston positioned so as to provide a soft compression.

DESCRIPTION OF THE PREFERRED EMBODIMENT

Figure 1:
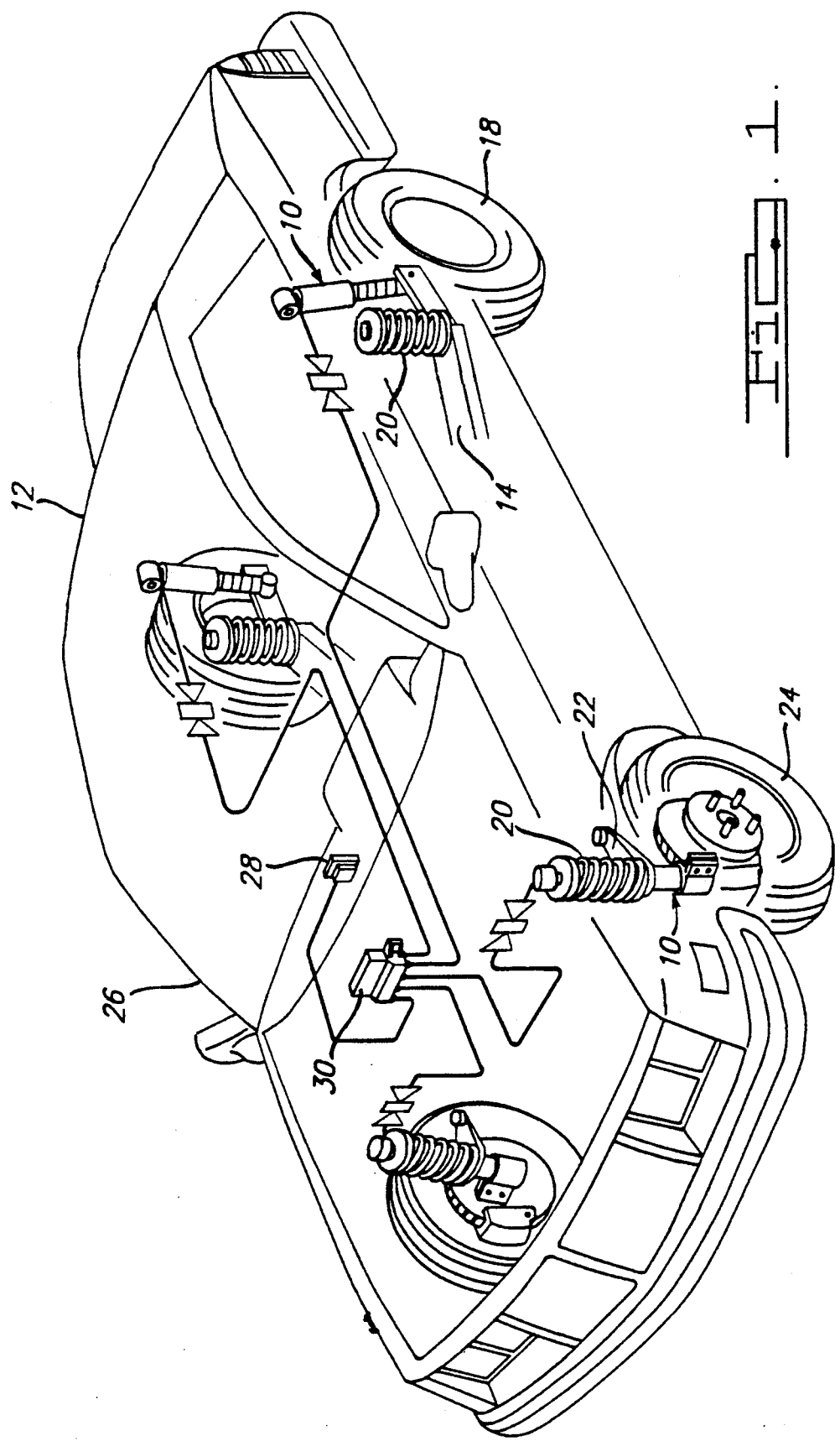
FIG. 1 is an illustration of an automobile using the method and apparatus for controlling piston-type fluid shock absorbers according to an exemplary preferred embodiment of the present invention.

FIGS. 1-6 illustrate an exemplary embodiment of an adjustable shock absorber according to the present invention, as adapted for providing a damping or cushioning effect between sprung and unsprung portions of the undercarriage of an automobile vehicle, or between other interconnected but relatively movable components of other devices. The term "shock absorber" as used herein refers to shock absorbers in the general sense of the phrase and includes MacPherson struts. Although, the present invention is depicted in the drawings as being adapted for various automotive application, one skilled in the art will readily recognize from the following discussion that the principles of the present invention are equally applicable to other types of suspension systems.

Referring to FIG. 1, four shock absorbers 10 according to the preferred embodiment of the present invention are shown in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assemble (not shown) to operatively support the vehicle's front wheels 24. The front axle assembly is operatively connected to the automobile 12 by means of a second pair of shock absorbers 10 and by the helical coil springs 20. The shock absorbers 10 serve to damp the relative movement of the unsprung portion (i.e., the front and rear suspension systems 22 and 14) and the sprung portion (i.e., shown as body 26 in FIG. 2A) of automobile 12.

To allow the damping characteristics of the shock absorbers 10 to be controlled, a mode select switch 28 and an electronic control module 30 are provided. The mode select switch 28 is located within the passenger compartment of the automobile 12 and is accessible by the occupants of the automobile 12 The mode select switch 28 is used for selecting which type of damping characteristics the shock absorbers 10 are to provide (i.e., firm, soft or automatic). The electronic control module 30 receives the output from the mode select switch 28 and is used for generating electronic control signals for controlling damping characteristics of the shock absorbers 10. By controlling the damping characteristics of the shock absorbers 10, the shock absorbers are able to dampen relative movement between the body 26 and the suspension system of the automobile in such a manner as to optimize both ride and comfort and road handling ability simultaneously.

The structure of the shock absorbers 10 are of the type shown and described in conjunction with the hereinabove U.S. Pat. No. 5,016,908, filed Mar. 13, 1989. In the discussion which follows, the shock absorber will be described briefly and only to the extent needed to identify the novel changes.

Figures 2A, 2B:
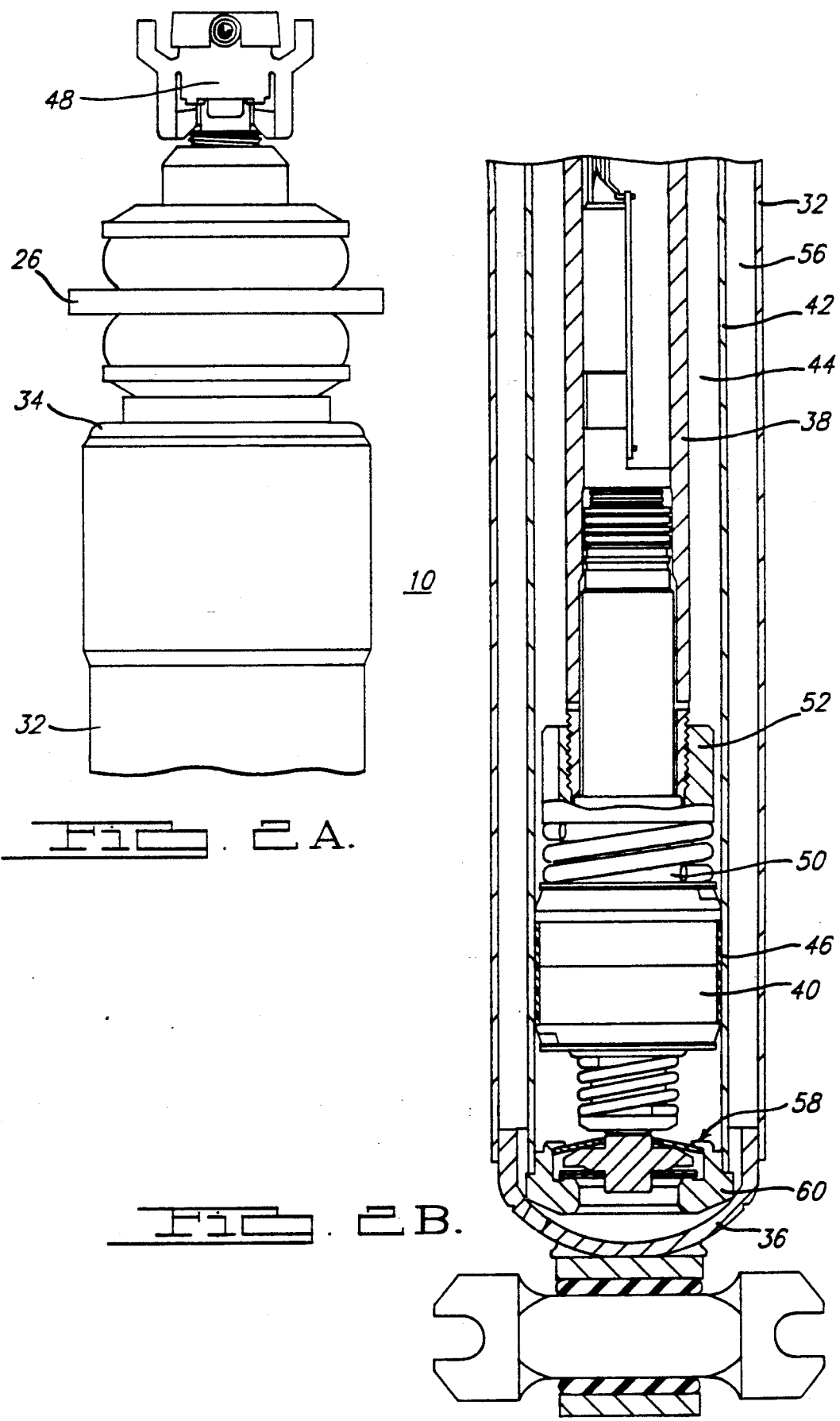
FIGS. 2A and 2B are longitudinal cross-sectional views, respectively, of the upper and lower end portions of the shock absorber according to an exemplary preferred embodiment of the present invention.

FIGS. 2A and 2B disclose that shock absorber 10 comprises an elongated, generally cylindrical, reserve tube 32, a cup-shaped cap 34 which closes the upper end of the tube, and a cup-shaped cap 36 which closes the lower end of the tube, thereby forming a closed chamber to store damping fluid. Extending axially through upper cap 34 is a piston rod 38 which is secured to a reciprocating piston assembly 40. The piston assembly 40 is axially displaceable within an elongated tubular pressure cylinder 42 which is disposed within the reserve tube 32. The pressure cylinder 42 defines a working chamber 44 in which upper and lower portions of the working chamber are, respectively, located above and below the piston assembly 40. A teflon sleeve 46 is disposed between the piston assembly 40 and the pressure cylinder 42 to facilitate movement of the piston assembly 40 with respect to pressure cylinder 42.

The shock absorber 10 is connected at its opposite end portions to the rear axle assembly of the automobile 12 and to the body 26 of the automobile 12. The details of such connection do not form part of this invention, as such, and a suitable construction is fully set forth in the hereinabove referenced patent application.

To permit electrical communication between the electronic control module 30 and an electrical coil described below, the shock absorber 10 further comprises an electrical connector assembly 48 which when operated allows for rapid electrical decoupling of the shock absorber 10 from the electronic control module 30 so that the shock absorber 10 may be replaced. The electronic control module 30 and its operation relative to control the shock absorbers is described in detail in the hereinabove incorporated patent. The electrical connector assembly 48 may be of the type which is shown in FIGS. 8-10 of U.S. Pat. No. 4,846,318, filed on Oct. 5, 1987, although other suitable electrical connectors may be used.

To support the piston assembly 40 on the piston rod 38, an axially extending piston post 50 and a piston post rod nut 52 are provided. The piston post 50 is generally circular in cross-section and extends axially through the central bore 54 (e.g., see FIG. 3) of the piston assembly 40. The piston post 50 is secured to the piston rod 38 by the piston post rod nut 52.

To allow damping fluid of the damping fluid reservoir 56 to flow into the working chamber 44, a base valve assembly 58 is provided as shown in FIG. 2B. The base valve assembly 58 comprises a generally cup-shaped pressure cylinder end portion 60 which is disposed coaxially with and adjacent to, the lower portion of the pressure cylinder 42. The end portion 60 contains a peripherally upwardly disposed recess which is operable to engage the lower portion of the pressure cylinder 42. The pressure cylinder 42 is secured to the recess by a suitable means such as a press-fit. It should be understood, however, that other suitable base valves may be used.

The piston assembly 40 will now be described in greater detail with respect to FIGS. 3, 4, 5 and 6. In this regard, details of certain associated structure are more specifically set out in the above-referenced U.S. Pat. No. 5,016,918, incorporated herein by reference.

Piston assembly 40 is used for controlling the flow of damping fluid between the upper and lower portions of the working chamber 44 and comprises a valve body 68 having upper and lower end faces 62 and 64, a first and second plurality of restricted vertical flow passages 70 and 72 extending between the end faces, a counter-recessed flow passage 74 in the upper end face of valve body 68, and a counter-recessed flow passage 76 in the lower end face 64 of valve body 68. Each flow passage 70 comprises a valve controlled upper outlet end portion 78 and a lower counter-recessed inlet end portion 80. Similarly, each flow passage 72 comprises a valve controlled lower outlet end portion 82 and an upper counter-recessed inlet end portion 84.

To allow the piston assembly 40 to regulate the flow of damping fluid between the upper and lower portions of the working chamber 44, an upper and lower spring seat 88 and 100, respectively, are disposed against faces 62 and 64. Spring seat 88 is disposed adjacent to the upper outlet end portion 78 of the flow passages 70, as well as to the upper inlet end portion 84 of the flow passages 72. Spring seat 100 is disposed adjacent to the lower inlet portion 76 of vertical passages 70, as well as to the outlet end portion 82 of the flow passages 72.

The spring seat 88 has radially extending upper and lower portions 92 and 94 as well as an axially extending portion 96. The radially extending lower portion 94 is disposed against upper end face 62 of the valve body 68 and superposes the flow passage 74. The axially extending portion 96 of the spring seat 88 extends axially from the radially extending portion 94 to a position immediately below the piston rod nut 52. The axially extending portion 96 further comprises a flow passage 98 which allows damping fluid in the upper portion of the working chamber 44 to flow therethrough and to the flow passage 74.

A helical valve spring 90 is disposed between the piston post rod nut 52 and the upper surface of the radially extending portion 94 of the spring seat 88 and biases the portion 94 thereof against the valve body. Valve spring 90 is in compression and forces the radially extending portion 94 of the spring seat 88 against the upper surface 62 of the spring seat and in closing relation against the upper outlet end portion 78 of the vertical flow passages 70.

The spring seat 100 comprises a radially extending first portion 102, a frusto-conical step portion 104, and a radially extending second portion 106, the step portion 104 having a flow passage 108 therein which allows damping fluid to flow therethrough. A disk-shaped spacer 112 is disposed within recess 76 and is coaxially disposed relative to the inward extension of second portion 106 and above a piston nut 114 which threadably engages the piston post 50.

A second valve spring 110 is disposed adjacent to the outer periphery of the upper portion of the piston nut 114 with the valve spring 110 placing an upward biasing force on the first portion 102 whereby to bias the spring seat 100 against face 64. Accordingly, the lower spring seat 100 is able to limit the flow of damping fluid flowing through the flow passages 72 during rebound.

The valve body 68 comprises a pair of cylindrical body portions 116 and 118 which are joined together to form an interior fluid reserve chamber 120, and an annular inner piston 122, the valve body being disposed coaxially with the axial centerline of the piston post 50. In the embodiment shown, the upper first body portion 116 comprises a plurality of flow passages 124 which extend coaxially with the axial centerline of the piston post, and the lower second body portion 118 comprises a plurality of flow passages 126 and 128 which extend coaxially with the centerline of the piston post, the flow passages 124 and 126 cooperating to form a continuous vertical flow passage from the upper face 62 inwardly and the flow passages 128 cooperating to form a vertical flow passage from the lower face 64 inwardly.

Further, the upper body portion 116 includes a plurality of pilot ports 130 and 132 which communicate, respectively, the fluid between the flow passage 124 into the fluid reserve chamber 120 and the fluid reserve chamber 120 into respective openings 134 of the piston post. Further, the lower body portion 118 includes a plurality of pilot ports 136 and 138, respectively, to pass fluid from the vertical passages 126 into the fluid reserve chamber 120 and therefrom through an respective openings 140 in the piston post. The body portions further include openings 142 and 144, respectively, which communicate fluid between passage 124 and 126 and the fluid reserve chamber 120 and therefrom to vertical passage 128.

The inner piston 122 is in the form of a two-part disk which is positioned in the fluid reserve chamber to move between upper and lower positions and divide the fluid reserve chamber into upper and lower chamber portions. Inner piston 122 basically "floats" between its upper and lower positions and includes a central passageway or annulus 146 which is adapted to be brought into and out from register with openings 142 and 144 to pass fluid from vertical passage 124 and 126 through the fluid reserve chamber 120 to the vertical passage 128.

A plunger member 148 is disposed coaxially within the piston post 50 and is cylindrical in cross-section, the lower end portion of which includes a region 150 which has a reduced external radius and a plurality of openings 152. The region 150 is used to allow damping fluid to flow between the piston openings 132 and pilot ports 134, or between the piston openings 138 and pilot ports 140, and the fluid reserve chamber 120. In addition plunger 148 includes a central pressure passage 154 which allows damping fluid in the lower portion of the working chamber 44 to fluidly communicate through piston post 50.

To cause movement of plunger member 148, an annular coil is provided as discussed in the hereinabove incorporated patent application, the plunger member and the coil forming a solenoid. Application of current to the coil causes the plunger to be displaced thereby causing the region 150 to move proximate the respective openings 134 and 140 of piston post 50, the region being appropriately dimensioned to close one opening while the other is open.

Figure 3:
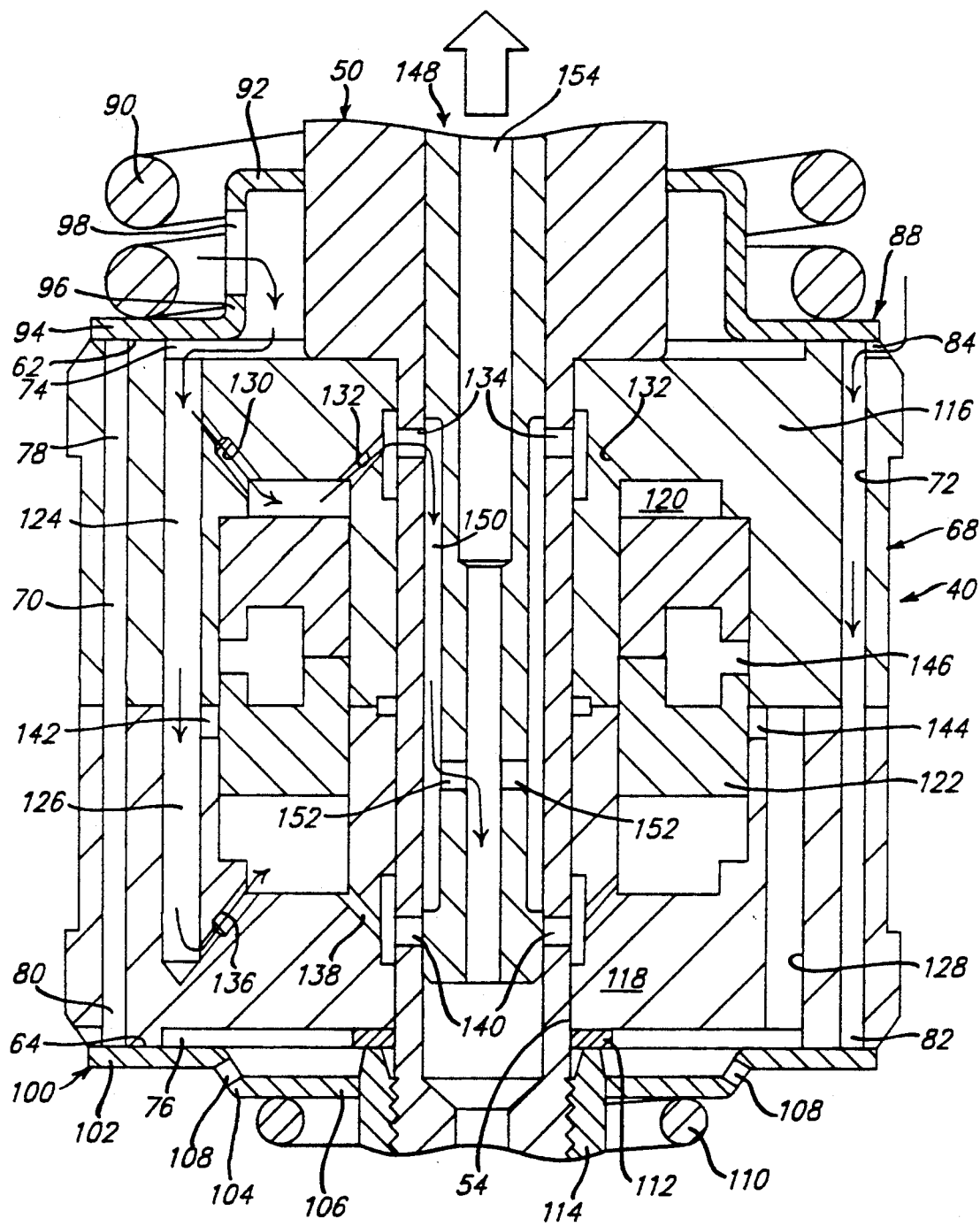
FIG. 3 is a partial longitudinal cross-sectional view of the piston assembly shown in FIG. 2B and shows a floating piston in the piston assembly being positioned so as to provide a firm rebound.
Figure 5:
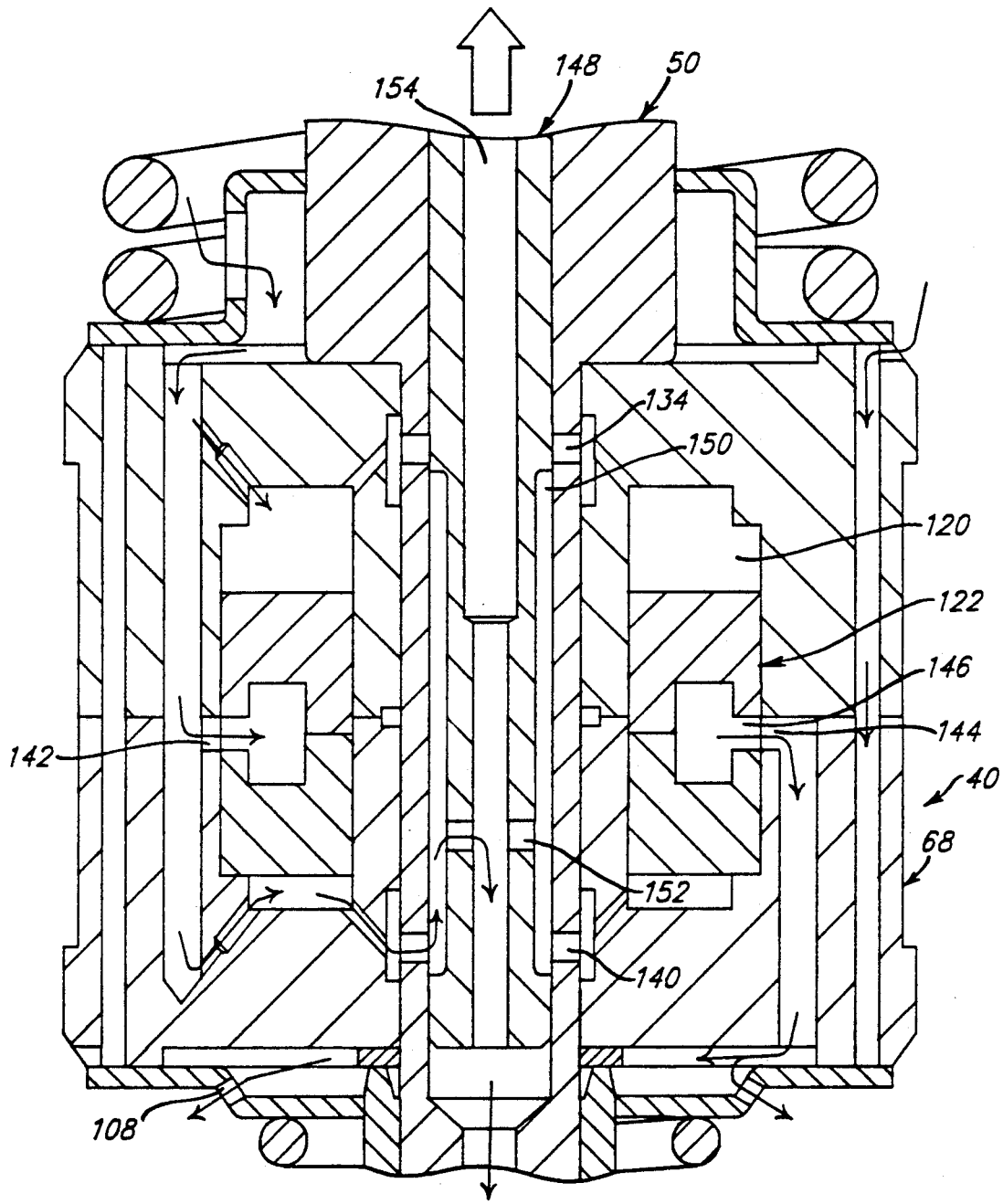
FIG. 5 is similar to FIG. 3 and shows the floating piston being positioned so as to provide a soft rebound.

During rebound, the piston is moving upwardly as shown in FIGS. 3 and 5. When plunger 148 closes piston post openings 140, as in FIG. 3, the upper chamber is put under high pressure and damping fluid is able to flow from the upper portion of the working chamber 44 to the lower portion of working chamber through the following passages: the flow passage 98, the flow passage 74, the flow passage 124 and 126, the pilot ports 130 and 136 into the fluid reserve chamber 120, the pilot port passages 132 and into the respective piston post openings 134, the passage formed by the region 150 between the piston and the plunger, the opening 152 through the plunger, and into center passage 154 of plunger 148. When this occurs, fluid flowing through pilot port 130 into the upper half of cavity 120 is vented through pilot port 132 and thus upper cavity 120 is at a lower pressure than the lower half of cavity 120 which is at a high pressure because plunger 148 blocks opening 140. Because of this inner piston 122 is driven upwardly, causing openings 142 and 144 to be covered. The increased pressure caused by the fluid flowing through flow passage 72 overcomes the biasing forces of valve spring 110, thereby causing the lower spring seat 100 to be displaced in a downward direction and fluid to flow outwardly of outlet 82 to the lower chamber. More damping fluid is therefor able to flow through the flow passages 72 thereby decreasing the damping forces which the piston assembly 40 generates and provides a firm rebound stroke.

Figure 4:
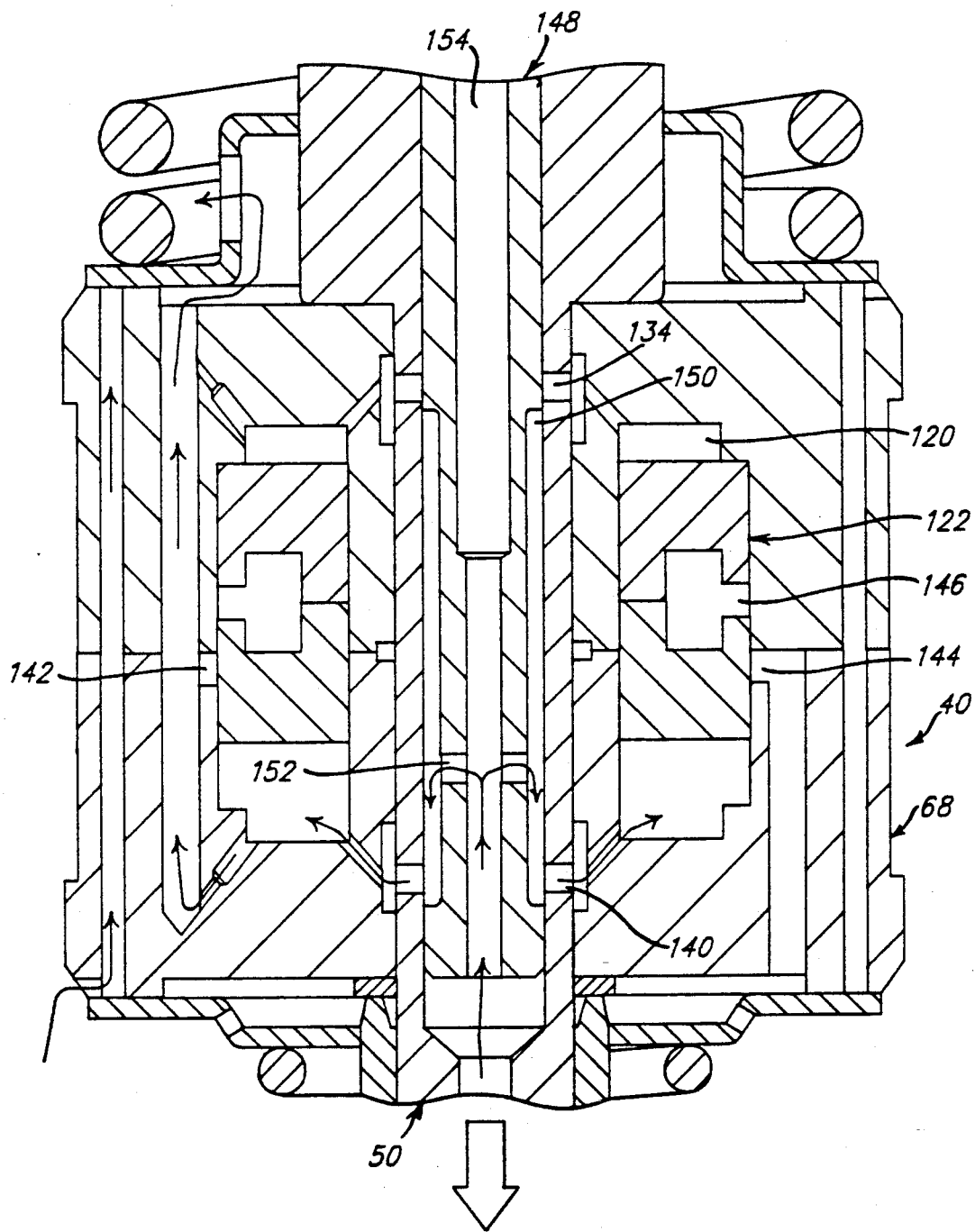
FIG. 4 is similar to FIG. 3 and shows the floating piston being positioned so as to provide a firm compression.

During compression, the piston is moving downwardly as shown in FIGS. 4 and 6. When plunger 148 closes piston post openings 134, as in FIG. 4, the lower chamber 44 is put under high pressure and damping fluid is able to flow through the following flow passages from the lower portion of the working chamber 44 to the region immediately above the upper end face of the valve body: through plunger central passage 154 and through plunger openings 152, through region 150, through pilot ports 138 into the lower half of chamber 120, through pilot ports 136 into passage 126 and 124, and outwardly of flow passage 74. Similarly, the fluid flowing through pilot port 138 into the lower half of chamber 120 is at high pressure, greater than the pressure of the upper half of chamber 120, causing disk to be driven upwardly and cover openings 140 and 142. The increased pressure caused by fluid passing through flow passage 70 overcomes the biasing forces of spring 90 thereby causing spring disk 86 to be displaced in an upward direction and uncovering opening 78. This provides a firm compression stroke.

During the rebound shown in FIG. 5, when the plunger member 148 is displaced downward in such a manner that the upper openings 134 of piston post 50 are closed and the region 150 of solenoid plunger 148 communicates with piston lower openings 138, a soft rebound is provided. In this situation, high pressure in the upper chamber 44 communicates via passages 124 and 126 with pilot ports 130 and 136. Because piston post opening 134 is closed by the solenoid plunger, the pressure in the upper half of chamber 120 is greater than that in the lower half of chamber 120. As a consequence, pressure forces cause the floating piston 122 to be driven downwardly in chamber 120 whereby its passageway 146 is brought into register with openings 142 and 144 of piston body 68. In this situation, augmented flow of damping fluid passes through passageway 124 and 126, through opening 142 into passageway 146 of the floating piston, through opening 144, and downwardly and outwardly via passages 128, 76 and 108. The increased flow through the floating piston 122, plus the flow through passage 72, provides a "soft" rebound.

Finally, during the compression shown in FIG. 6, when the plunger 144 is displaced upwardly in such a manner that the piston openings 140 are covered and openings 134 are uncovered, the floating piston 122 is driven downwardly and have its passageway 146 aligned with openings 142 and 144 of piston 68. The augmented flow of fluid through floating piston 122, plus the flow of fluid through passage 70 between the upper and lower chambers, results in a "soft" compression.

As discussed in more detail in U.S. Pat. No. 5,016,918, a pressure sensor is provided to determine whether the shock absorber is in compression or rebound, the sensor being electrically interconnected to signal conditioning units, and to the control module to control the pressure differential between the upper and lower chambers. While details of the control arrangement are provided in Ser. No. 322,774, the sensor determines the difference in pressure between the damping fluid in chamber 44 and generates a first electrical signal in response to that difference. A second sensor in the form of an accelerometer detects movement of the body of the automobile and generate a second electrical signal in response to that acceleration (or velocity). A control member is provided to receive the electrical signals and generate a command signal directing the plunger to be energized into a first or a second position.

While the above description constitutes the preferred embodiment of the invention, it will be appreciated that the invention is susceptible to modification, variation, and change without departing from the proper scope or fair meaning of the accompanying claims. For example, floating piston 122 could comprise a solid disk of suitable thickness and the openings 142 and 144 of the piston body 68 adjusted appropriately such that the piston, as modified, would divide chamber 122 into two portions and would move from a first position, such as shown in FIGS. 3 and 4, wherein the disk thickness closes openings 142 and 144, to a second position, such as shown in FIGS. 5 and 6, wherein the disk thickness uncovers openings 142 and 144.

What I claim is:

1. A shock absorber for damping the movement of the body of an automobile relative to a wheel of said automobile, comprising a piston disposed for reciprocation in a fluid pressure cylinder and dividing said cylinder into first and second chambers, first valve means operable during a compression stroke of the piston for permitting damping fluid to flow from said first chamber to said second chamber, second valve means operable during a rebound stroke of the piston for permitting damping fluid to flow from said second chamber to said first chamber, third valve means formed in said piston for permitting damping fluid to flow between the first and second chambers, respectively, during said compression and said rebound strokes, said third valve means including said piston including a cavity and a disk member disposed in said cavity and movable between an upper and lower position in said cavity by operating pressures in said first and second chambers, electrically operable flow control means, including a displaceable plunger to control the flow of said damping fluid through, respectively, a first flow path between said first chamber and said second valve means, a second flow path between the second chamber and said first valve means, and a third flow path between said first and second chambers and said third valve means, an actuating means for controllably actuating said flow control means in response to the pressure differential between said first and second chambers as the piston reciprocates in response to the movement of the body of said automobile, said actuating means operable to generate a firm damping during compression and rebound by displacing said disk member to close said third flow path and a soft damping during compression and rebound by displacing said disk member to open said third flow path.

2. The shock absorber as set forth in claim 1, wherein said shock absorber comprises a piston rod secured to said piston, and said disk member has an annular flow passage therethrough, the annular flow passage being adapted to form parts of said third flow path.

3. The shock absorber as set forth in claim 1, wherein said piston includes a pair of passages extending between opposite end faces thereof, and a respective pair of spring seats are biased against said end faces in covering relation to at least one of said passages, said spring seats respectively for controlling the flow of damping fluid through the chambers of said pressure cylinder during compression and rebound of the shock absorber.

4. The shock absorber as set forth in claim 1, wherein said plunger is operable to control the flow of damping fluid through said first and second flow paths.

* * * * *